US009896524B2

(12) United States Patent
Wang et al.

(10) Patent No.: US 9,896,524 B2
(45) Date of Patent: *Feb. 20, 2018

(54) LOW EMISSION PROPYLENE HOMOPOLYMER

(71) Applicant: Borealis AG, Vienna (AT)

(72) Inventors: Jingbo Wang, Linz (AT); Johanna Lilja, Porvoo (FI); Thomas Horill, Gerasdorf (AT); Markus Gahleitner, Neuhofen/Krems (AT); Peter Denifl, Helsinki (FI); Timo Leinonen, Tolkkinen (FI)

(73) Assignee: Borealis AG (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/034,762

(22) PCT Filed: Nov. 19, 2014

(86) PCT No.: PCT/EP2014/074984
§ 371 (c)(1),
(2) Date: May 5, 2016

(87) PCT Pub. No.: WO2015/075054
PCT Pub. Date: May 28, 2015

(65) Prior Publication Data
US 2016/0272741 A1    Sep. 22, 2016

(30) Foreign Application Priority Data

Nov. 22, 2013  (EP) ..................................... 13194119

(51) Int. Cl.
*C08F 110/06* (2006.01)
*C08F 4/651* (2006.01)
*C08F 4/654* (2006.01)
*C08F 2/00* (2006.01)
*B29C 45/00* (2006.01)

(52) U.S. Cl.
CPC ................................ *C08F 110/06* (2013.01)

(58) Field of Classification Search
CPC ........ C08F 4/651; C08F 4/654; C08F 110/06; C08F 2500/15
USPC ..................... 526/65, 351; 525/53
See application file for complete search history.

(56) References Cited

U.S. PATENT DOCUMENTS

2007/0142578 A1*  6/2007  Marin ................... B01J 31/2295
                                                    526/126
2012/0270039 A1* 10/2012  Tynys .................... C08L 23/10
                                                    428/338

FOREIGN PATENT DOCUMENTS

| EP | 0887379 A1 | 12/1998 |
| EP | 0887380 B1 | 2/2004 |
| EP | 0887381 B1 | 11/2005 |
| EP | 0991684 B1 | 1/2006 |
| EP | 2610271 A1 | 7/2013 |
| EP | 2610272 A1 | 7/2013 |
| EP | 2610270 B1 | 10/2015 |
| JP | 2001-518533 A | 10/2001 |
| JP | 2002-504953 A | 2/2002 |
| JP | 2013-040304 A | 2/2013 |
| KR | 2013-0037713 A | 4/2013 |
| WO | 9212182 A1 | 7/1992 |
| WO | 98/58975 A1 | 12/1998 |
| WO | 99/16797 A1 | 4/1999 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | 2007122239 A1 | 11/2007 |
| WO | 2012007430 A1 | 1/2012 |
| WO | 2013127707 A1 | 9/2013 |

OTHER PUBLICATIONS

Tensile Properties of Plastics, Matweb Material Property Data (Copyright 1996-2016), 2 pages.*
Busico, Vincenzo, et al., "Full Assignment of the 13C NMR Spectra of Regioregular Polypropylenes: Methyl and Methylene Region", Macromolecules 1997, 30, 6251-6263.
Busico, Vincenzo, et al., "Microstructure of Polypropylene", Prog. Polym. Sci 26 (2001) 443-533.
Busico, Vincenzo, et al., "Alk-1-Ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Cheng, H.N., "13C NMR Analysis of Ethylene-Propylene Rubbers", Macromolecules 1984, 17, 1950-1955.
Resconi, Luigi, et al., "Selectivity in Propene Polymerization With Metallocene Catalysts", Chem. Rev. 2000, 100, 1253-1345.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Zweifel, Plastic Additive Handbook, 2001, pp. 871-874.
International Preliminary Report on Patentability, dated Jun. 2, 2016.
Notice of Preliminary Rejection for Korean Patent Application No. 10-2016-701595.
Tokuyama polypro technical magazine, Jul. 2000, 3rd Ed., p. 26, graph "Natural PP".
Japanese Office Action for Application No. 2016-527430, dated May 26, 2017.

* cited by examiner

*Primary Examiner* — Fred M Teskin
(74) *Attorney, Agent, or Firm* — Tarolli, Sundheim, Covell & Tummino LLP

(57) ABSTRACT

Propylene homopolymer with reduced emission value.

12 Claims, No Drawings

LOW EMISSION PROPYLENE HOMOPOLYMER

The present invention is directed to a new propylene homopolymer with reduced emissions as well as to its manufacture and use.

Polypropylene is used in many applications. Depending on its end applications the properties of the polypropylene must be tailored accordingly. For instance some end applications require very stiff material. Further nowadays the polymer processors desire material with low emissions to fulfil the consistently rising demands of regulatory authorities as well as consumers.

Typically, adsorbing additives are used to achieve low emission values. For instance in WO 2011/023594 melamine is employed to obtain polymer material with reduced emission values. In WO 92/13029 A1 zeolites are used for the same purpose. Two disadvantages of these solutions employing absorbing additive particles are the parallel absorption of antioxidants and the unsuitability for film and fibre applications.

Thus the object of the present invention is to provide a polymer material which is rather stiff and characterized by low emissions.

The finding of the present invention is that a propylene homopolymer must be produced with a Ziegler-Natta catalyst containing an internal donor (ID) not belonging to the class of phthalic acid ester. With such a catalyst propylene homopolymer can be produced having excellent stiffness and low emission values.

Thus the present invention is directed to a propylene homopolymer having (a) a melt flow rate $MFR_2$ (230° C./2.16 kg) measured according to ISO 1133 in the range of 0.1 to 90 g/10 min; and
(b) a pentad isotacticity (mmmm) of more than 90.0% determined by $^{13}$C-NMR;

wherein further
(c) the propylene homopolymer fulfills in equation (I)

$$VOC \leq (MFR \times 2.27) + 32.0$$

wherein
VOC is the amount of volatile organic compounds (VOC) [in ppm] measured according to VDA 278:2002 of the propylene homopolymer, preferably of the propylene homopolymer in form of pellets; and
MFR is the melt flow rate $MFR_2$ (230° C./2.16 kg) measured according to ISO 113 of the propylene homopolymer.

In one preferred embodiment the propylene homopolymer according to this invention has a VOC value measured according to VDA 278:2002 of equal or below 215 ppm.

Additionally or alternatively to the VOC value, the propylene homopolymer according to this invention can be also characterized by its FOG value. Accordingly it is preferred that the propylene homopolymer fulfills in equation (II)

$$FOG \leq (MFR \times 4.80) + 100.0$$

wherein
FOG is the amount of fogging compounds (FOG) [in ppm] measured according to VDA 278:2002 of the propylene homopolymer, preferably of the propylene homopolymer in form of pellets; and
MFR is the melt flow rate $MFR_2$ (230° C./2.16 kg) measured according to ISO 113 of the propylene homopolymer.

In one preferred embodiment the propylene homopolymer according to this invention has a FOG value measured according to VDA 278:2002 of not more than 490 ppm.

Preferably the propylene homopolymer according to this invention has a melting temperature Tm of equal or more than 160° C. and/or a crystallization temperature of equal or more than 114° C.

In another preferred embodiment the propylene homopolymer according to this invention has a xylene cold soluble content (XCS) determined according ISO 16152 (25° C.) of at least 1.8 wt.-%, preferably in the range of 1.8 to 5.5 wt.-%.

It is in particular preferred that the propylene homopolymer according to this invention has 2,1 erythro regio-defects of equal or below 0.4 mol.-% determined by $^{13}$C-NMR spectroscopy and/or a pentad isotacticity (mmmm) of more than 93.0% determined by $^{13}$C-NMR.

It is further preferred that the propylene homopolymer according to this invention has a tensile modulus measured at 23° C. according to ISO 527-1 (cross head speed 1 mm/min) of at least 1,500 MPa.

The present invention is also directed to an article comprising the propylene homopolymer as described herein.

The present invention is also directed to the manufacture of the propylene homopolymer as defined herein, wherein said propylene homopolymer is obtained by polymerizing propylene in the presence of
(a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester;
(b) optionally a co-catalyst (Co), and
(c) optionally an external donor (ED).

It is in particular preferred that
(a) the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate;
and/or
(b) the molar ratio of co-catalyst (Co) to external donor (ED) [Co/ED] is 5 to 45.

In one preferred embodiment the propylene homopolymer is produced in a sequential polymerization process comprising at least two reactors (R1) and (R2), in the first reactor (R1) a first propylene homopolymer fraction (H-PP1) is produced and subsequently transferred into the second reactor (R2), in the second reactor (R2) a second propylene homopolymer fraction (H-PP2) is produced in the presence of the first propylene homopolymer fraction (H-PP1), wherein a catalyst is used as defined above and in more detail below.

In the following the invention is described in more detail.

According to the present invention the expression "propylene homopolymer" relates to a polypropylene that consists substantially, i.e. of at least 99.0 wt.-%, more preferably of at least 99.5 wt.-%, still more preferably of at least 99.8 wt.-%, like of at least 99.9 wt.-%, of propylene units. In another embodiment only propylene units are detectable, i.e. only propylene has been polymerized.

One requirement of the propylene homopolymer according to this invention is its melt flow rate. Accordingly the propylene homopolymer has an $MFR_2$ (230° C./2.16 kg) measured according to ISO 1133 in the range of 0.1 to 90 g/10 min, preferably in the range of 0.5 to 85 g/10 min, more preferably in the range of 0.5 to 81.0 g/10 min, even more preferably in the range of 1.0 to 80.0 g/10 min, like in the range of 5.0 to 80.0 g/10 min.

The propylene homopolymer is especially featured by its low emissions. Contrary to the propylene homopolymers known in the art the emissions are rather low at a specific molecular weight compared to known products. Thus the propylene homopolymer fulfills in equation (I), more preferably in equation (Ia), $$VOC \leq (MFR \times 2.27) + 32.0 \quad (I)$$

$$VOC \leq (MFR \times 2.27) + 27.0 \quad (Ia)$$

wherein
VOC is the amount of volatile organic compounds (VOC) [in ppm] measured according to VDA 278:2002 of the propylene homopolymer, preferably of the propylene homopolymer in form of pellets; and
MFR is the melt flow rate $MFR_2$ (230° C./2.16) measured according to ISO 113 of the propylene homopolymer.

Preferably the amount of volatile organic compounds (VOC) measured according to VDA 278:2002 of propylene homopolymer is equal or below 215 ppm, more preferably equal or below 212 ppm, like equal or below 210 ppm.

The VOC values are measured on pellets as defined in detail below. However also the VOC values measured on plates are reduced vis-à-vis the state of the art (see examples).

Additionally or alternatively to the VOC value, the propylene homopolymer according to this invention preferably fulfills in equation (II)

$$FOG \leq (MFR \times 4.80) + 100.0 \quad (II)$$

wherein
FOG is the amount of fogging compounds (FOG) [in ppm] measured according to VDA 278:2002 of the propylene homopolymer, preferably of the propylene homopolymer in form of pellets; and
MFR is the melt flow rate $MFR_2$ (230° C./2.16 kg) measured according to ISO 113 of the propylene homopolymer.

Preferably the amount of fogging compounds (FOG) measured according to VDA 278:2002 of propylene homopolymer is not more than 490 ppm, more preferably not more than 485 ppm.

The FOG values are measured on pellets as defined in detail below. However also the FOG values measured on plates are reduced vis-à-vis the state of the art (see examples).

The propylene homopolymer is further defined by its microstructure.

Preferably the propylene homopolymer is isotactic. Accordingly it is preferred that the propylene homopolymer has a rather high pentad concentration (mmmm %) determined by $^{13}$C-NMR, i.e. more than 93.0%, more preferably more than 93.5%, like more than 93.5 to 97.5%, still more preferably at least 95.0%, like in the range of 95.0 to 97.5%.

A further characteristic of the propylene homopolymer is the low amount of misinsertions of propylene within the polymer chain, which indicates that the propylene homopolymer is produced in the presence of a Ziegler-Natta catalyst, preferably in the presence of a Ziegler-Natta catalyst (ZN-C) as defined in more detail below. Accordingly the propylene homopolymer is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

It is preferred that the propylene homopolymer according to this invention is featured by rather high cold xylene soluble (XCS) content, i.e. by a xylene cold soluble (XCS) of at least 1.8 wt.-%, like at least 2.0 wt.-%. Accordingly the propylene homopolymer has preferably a xylene cold soluble content (XCS) in the range of 1.8 to 5.5 wt.-%, more preferably in the range of 2.0 to 5.0 wt.-%, still more preferably in the range of 2.2 to 5.0 wt.-%.

The amount of xylene cold solubles (XCS) additionally indicates that the propylene homopolymer is preferably free of any elastomeric polymer component, like an ethylene propylene rubber. In other words, the propylene homopolymer shall be not a heterophasic polypropylene, i.e. a system consisting of a polypropylene matrix in which an elastomeric phase is dispersed. Such systems are featured by a rather high xylene cold soluble content.

The amount of xylene cold solubles (XCS) additionally indicates that the propylene homopolymer preferably does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene homopolymer according to this invention has no glass transition temperature below −30, preferably below −25° C., more preferably below −20° C.

On the other hand, in one preferred embodiment the propylene homopolymer according to this invention has a glass transition temperature in the range of −12 to 5° C., more preferably in the range of −10 to 4° C.

Further, the propylene homopolymer is preferably a crystalline. The term "crystalline" indicates that the propylene homopolymer has a rather high melting temperature. Accordingly throughout the invention the propylene homopolymer is regarded as crystalline unless otherwise indicated. Therefore the propylene homopolymer preferably has a melting temperature measured by differential scanning calorimetry (DSC) of equal or more than 160° C., i.e. of equal or more than 160 to 168° C., more preferably of at least 161° C., i.e. in the range of 161 to 166° C.

Further it is preferred that the propylene homopolymer has a crystallization temperature measured by differential scanning calorimetry (DSC) of equal or more than 114° C., more preferably in the range of 114 to 128° C., more preferably in the range of 118 to 126° C.

The propylene homopolymer is further featured by high stiffness. Accordingly the instant propylene homopolymer has a rather high tensile modulus. Accordingly it is preferred that propylene homopolymer has a tensile modulus measured at 23° C. according to ISO 527-1 (cross head speed 1 mm/min) of at least 1,400 MPa, more preferably in the range of 1,400 to 2,000 MPa, still more preferably in the range of 1,500 to 1,800 MPa.

Preferably the propylene homopolymer according to this invention does not contain a 1, 3, 5 triazine derivatives of formula (I)

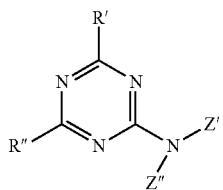

(I)

wherein

R' and R" are independently selected from the group, NHZ', NZ'Z", C1 to C10 alkyl, phenyl, and benzyl Z' and Z" are independently selected from the group H, methyl, ethyl, n-propyl, iso-propyl, n-butyl, tert-butyl, and n-pentyl.

Preferably the propylene homopolymer according to this invention does not contain a hydrophobic aluminium silicate molecular sieve having an Si/Al molar ratio in the crystal lattice above 35, a pore diameter of at least 5.5 A and a sorption capacity for water at 250° C. and 4.6 torr of less than 10 wt.-%. Even more preferably the propylene homopolymer according to this invention does not contain a (hydrophobic) aluminium silicate.

Preferably the propylene homopolymer is obtained by polymerizing propylene in the presence of a Ziegler-Natta catalyst as defined in more detail below. Still more preferably the propylene homopolymer according to this invention is obtained by a process as defined in detail below by using the Ziegler-Natta catalyst as defined herein.

The invention is also directed to an article comprising the propylene homopolymer. Preferably the article comprises based on the total amount of the article at least 50 wt.-%, like 50 to 99.9 wt.-%, more preferably at least 60 wt.-%, like 60 to 99 wt.-%, still more preferably 70 wt.-%, like 70 to 99.9 wt.-%, of the propylene homopolymer.

Preferably the article is an extruded article, like a film, or an injection moulded article. In one embodiment the article can be also a blow moulded article, like an injection blow moulded article.

The propylene homopolymer according to this invention (as described below) can comprises, more preferably can consist of, two fractions, namely a first propylene homopolymer fraction (H-PP1) and a second propylene homopolymer fraction (H-PP2). Preferably the weight ratio between the first propylene homopolymer fraction (H-PP1) and the second propylene homopolymer fraction (H-PP2) [(H-PP1): (H-PP2)] is 70:30 to 40:60, more preferably 65:35 to 45:55.

The first propylene homopolymer fraction (H-PP1) and the second propylene homopolymer fraction (H-PP2) may differ in the melt flow rate. However it is preferred that the melt flow rate $MFR_2$ (230° C.) of the first propylene homopolymer fraction (H-PP1) and of the second propylene homopolymer fraction (H-PP2) are nearby identical, i.e. differ not more than 15% as calculated from the lower of the two values, preferably differ not more than 10%, like differ not more than 7%.

The propylene homopolymer as defined in the instant invention may contain up to 5.0 wt.-% additives (except the triazine derivatives as mentioned above), like antioxidants, slip agents and antiblocking agents. Preferably the additive content is below 3.0 wt.-%, like below 1.0 wt.-%.

In case the propylene homopolymer comprises a α-nucleating agent, it is preferred that it is free of β-nucleating agents. The α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", pages 871 to 873, 5th edition, 2001 of Hans Zweifel.

Preferably the propylene homopolymer contains up to 3 wt.-% of the α-nucleating agent. In a preferred embodiment, the propylene homopolymer contains not more than 2000 ppm, more preferably of 5 to 2000 ppm, more preferably of 50 to 1500 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4, 6,-di-tert-butylphenyl) phosphate, vinylcycloalkane polymer, vinylalkane polymer, and mixtures thereof.

In the following the manufacture of the propylene homopolymer is described in more detail.

The propylene homopolymer according to this invention is preferably produced the presence of (a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester;

(b) optionally a co-catalyst (Co), and (c) optionally an external donor (ED).

More preferably, the propylene homopolymer is produced in a sequential polymerization process comprising at least two reactors (R1) and (R2), in the first reactor (R1) the first propylene homopolymer fraction (H-PP1) is produced and subsequently transferred into the second reactor (R2), in the second reactor (R2) the second propylene homopolymer fraction (H-PP2) is produced in the presence of the first propylene homopolymer fraction (H-PP1).

The term "sequential polymerization system" indicates that the propylene homopolymer is produced in at least two reactors connected in series. Accordingly the present polymerization system comprises at least a first polymerization reactor (R1) and a second polymerization reactor (R2), and optionally a third polymerization reactor (R3). The term "polymerization reactor" shall indicate that the main polymerization takes place. Thus in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly the average concentration of the first fraction ($1^{st}$ F) of the propylene homopolymer (i.e. the first propylene homopolymer fraction (H-PP1)), in the polymer slurry within the loop reactor (LR) is typically from 15 wt.-% to 55 wt.-%, based on the total weight of the polymer slurry within the loop reactor (LR). In one preferred embodiment of the present invention the average concentration of the first propylene homopolymer fraction (H-PP1) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably the propylene homopolymer of the first polymerization reactor (R1), i.e. the first propylene homopolymer fraction (H-PP1), more preferably the polymer slurry of the loop reactor (LR) containing the first propylene homopolymer fraction (H-PP1), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first propylene homopolymer fraction (H-PP1), is led directly to the next stage gas phase reactor.

Alternatively, the propylene homopolymer of the first polymerization reactor (R1), i.e. the first propylene homopolymer fraction (H-PP1), more preferably polymer slurry of the loop reactor (LR) containing the first propylene homopolymer fraction (H-PP1), may be also directed into a flash step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly for the instant process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used. If needed prior to the slurry reactor (SR) a pre-polymerization reactor is placed.

The Ziegler-Natta catalyst (ZN-C) is fed into the first polymerization reactor (R1) and is transferred with the polymer (slurry) obtained in the first polymerization reactor (R1) into the subsequent reactors. If the process covers also a pre-polymerization step it is preferred that all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and optional in the third reactor (R3) is in the range of 75 to 95° C., more preferably in the range of 78 to 92° C.

Preferably the operating temperature in the second polymerization reactor (R2) is equal or higher to the operating temperature in the first polymerization reactor (R1). Accordingly it is preferred that the operating temperature
(a) in the first polymerization reactor (R1) is in the range of 62 to 85° C., more preferably in the range of 65 to 85° C., still more preferably in the range of 67 to 82° C., like 70 to 80° C.;
and
(b) in the second polymerization reactor (R2) is in the range of 75 to 95° C., more preferably in the range of 78 to 92° C., still more preferably in the range of 78 to 88° C.; with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range of from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range of from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

Accordingly the average residence time (τ) in the first polymerization reactor (R1) is preferably at least 15 min, more preferably in the range of 15 to 80 min, still more preferably in the range of 20 to 60 min, like in the range of 24 to 50 min, and/or the average residence time (τ) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time (τ) in the third polymerization reactor (R3)—if present—is preferably at least 30 min, more preferably in the range of 30 to 120 min, still more preferably in the range of 40 to 100 min, like in the range of 50 to 90 min.

As mentioned above the instant process can comprises in addition to the (main) polymerization of the propylene homopolymer in the at least two polymerization reactors (R1, R3 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

In case that pre-polymerization is not used propylene and the other ingredients such as the Ziegler-Natta catalyst (ZN-C) are directly introduced into the first polymerization reactor (R1).

Accordingly the process according the instant invention comprises the following steps under the conditions set out above (a) in the first polymerization reactor (R1), i.e. in a loop reactor (LR), propylene is polymerized obtaining a first propylene homopolymer fraction (H-PP1) of the propylene homopolymer (H-PP), (b) transferring said first propylene homopolymer fraction (H-PP1) to a second polymerization reactor (R2), (c) in the second polymerization reactor (R2) propylene is polymerized in the presence of the first propylene homopolymer fraction (H-PP1) obtaining a second propylene homopolymer fraction (H-PP2) of the propylene homopolymer, said first propylene homopolymer fraction (H-PP1) and said second propylene homopolymer fraction (H-PP2) form the propylene homopolymer.

A pre-polymerization as described above can be accomplished prior to step (a).

The Ziegler-Natta Catalyst (ZN-C), the External Donor (ED) and the Co-Catalyst (Co)

As pointed out above in the specific process for the preparation of the propylene copolymer (R-PP) as defined above a Ziegler-Natta catalyst (ZN-C) must be used. Accordingly the Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is self-supported.

The Ziegler-Natta catalyst (ZN-C) can be further defined by the way as obtained. Accordingly the Ziegler-Natta catalyst (ZN-C) is preferably obtained by a process comprising the steps of a)

$a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;

or $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium; or a₃) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of a₂) or a₃) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"$(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stilling and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula $$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula $$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor).

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkylaluminum, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as $AlH_3$, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

In the following the present invention is further illustrated by means of examples.

EXAMPLES

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187

(2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^{1}H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

$$[mmmm]\%=100*(mmmm/\text{sum of all pentads})$$

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio-defects:

$$P_{total}=P_{12}+P_{21e}$$

The mole percent of 2,1 erythro regio-defects was quantified with respect to all propene:

$$[21e]\text{ mol.-}\%=100*(P_{21e}/P_{total})$$

MFR$_2$ (230° C./2.16 kg) is measured according to ISO 1133 (230° C., 2.16 kg load)

The xylene soluble fraction at room temperature (XS, wt.-%): The amount of the polymer soluble in xylene is determined at 25° C. according to ISO 16152; first edition; 2005 Jul. 1.

DSC analysis, melting temperature ($T_m$) and heat of fusion ($H_f$), crystallization temperature ($T_c$) and heat of crystallization ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step p.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Charpy impact test: The Charpy notched impact strength (NIS) was measured according to ISO 179 1 eA at +23° C., using injection molded bar test specimens of 80×10×4 mm$^3$ prepared in accordance with ISO 294-1:1996.

Tensile test: The tensile modulus was measured at 23° C. according to ISO 527-1 (cross head speed 1 mm/min) using injection moulded specimens moulded at 180° C. or 200° C. according to ISO 527-2(1B), produced according to EN ISO 1873-2 (dog 10 bone shape, 4 mm thickness).

Total Volatiles
VOC

VOC was determined according to VDA 278:2002 from pellets or plates of 60×60×2 mm$^3$ prepared by injection molding in accordance with ISO 294-1:1996.

VOC according to VDA 278 is the sum of all high and medium volatile compounds. It is calculated as toluene equivalent (TE). VOC according to VDA 278 represents all organic compounds in the boiling point and elution range of up to C$_{20}$ (n-eicosane).

FOG

FOG was determined according to VDA 278:2002 from pellets or plates of 60×60×2 mm$^3$ prepared by injection molding in accordance with ISO 294-1:1996.

FOG according to VDA 278 is the sum of all organic compounds of low volatility, which have an elution time greater than or equal to n-hexadecane. FOG is calculated as hexadecane equivalent (HE). FOG according to VDA 278 represents organic compounds in the boiling point range of n-alkanes C16 to C32.

VDA standards are issued by "Verband der Automobilindustrie". The VDA standards used herein are available from "Dokumentation Kraftfahrwesen (DKF); Ulrichstrasse 14, D-74321 Bietigheim-Bissingen, Germany or can be downloaded from their website (www.dkf-ev.de).

B. Examples

The catalyst used in the polymerization process for the propylene homopolymers of the inventive examples (IE1 to IE4) was prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min) During the first heptane wash the temperature was decreased to 50° C. and during the second wash to room temperature.

The thus obtained catalyst was used along with triethyl-aluminium (TEAL) as co-catalyst and dicyclo pentyl dimethoxy silane (D-donor) or cyclohexylmethyl dimethoxy silane (C-Donor) as donor.

The catalyst used in the polymerization processes of the comparative example (CE1) was the catalyst of the example section of WO 2010009827 A1 (see pages 30 and 31) along with triethyl-aluminium (TEAL) as co-catalyst and dicyclo pentyl dimethoxy silane (D-donor) as donor.

The aluminium to donor ratio, the aluminium to titanium ratio and the polymerization conditions are indicated in table 1.

TABLE 1

Preparation of the Examples

| | | CE1 | IE1 | IE2 | IE3 | IE4 |
|---|---|---|---|---|---|---|
| Donor | type | D | D | D | C | D |
| TEAL/Ti | [mol/mol] | 150 | 125 | 144 | 150 | 262 |
| TEAL/Donor | [mol/mol] | 15 | 5 | 15 | 18.8 | 9.4 |
| Loop (H-PP1) | | | | | | |
| Time | [h] | 0.6 | 0.56 | 0.4 | 0.66 | 0.52 |
| Temperature | [° C.] | 80 | 75 | 75 | 75 | 75 |
| $MFR_2$ | [g/10 min] | 8.0 | 0.6 | 8.0 | 77.0 | 81.0 |
| XCS | [wt.-%] | 2.2 | 2.3 | 2.7 | 4.9 | 2.7 |
| $H_2$/C3 ratio | [mol/kmol] | 1.2 | 0.2 | 1.1 | 7.2 | 7.6 |
| Amount | [wt.-%] | 61 | 47 | 53 | 100 | 50 |
| 1 GPR (H-PP2) | | | | | | |
| Time | [h] | 1.5 | 1.52 | 2.8 | — | 1.97 |
| Temperature | [° C.] | 85 | 80 | 80 | — | 80 |
| $H_2$/C3 ratio | [mol/kmol] | 14.2 | 0.7 | 12.9 | — | 93.8 |
| Amount | [wt.-%] | 39 | 53 | 47 | 0 | 50 |
| Final | | | | | | |
| $MFR_2$ | [g/10 min] | 8.0 | 0.6 | 8.0 | 79 | 81 |
| XCS | [wt.-%] | 2.2 | 2.3 | 2.6 | 4.9 | 2.8 |
| Tm | [° C.] | 162.5 | 165.0 | 165.0 | 162.6 | 165.0 |
| Tc | [° C.] | 113.3 | 114.3 | 124.8 | 122.4 | 120.5 |
| 2,1 | [—] | n.d | n.d. | n.d. | n.d. | n.d |
| Mmmm | [%] | 96.0 | 95.2 | 95.6 | 93.5 | 96.5 |

TABLE 2

Properties of the Examples

| Example | | CE1 | IE1 | IE2 | IE3 | IE4 |
|---|---|---|---|---|---|---|
| MFR | [g/10 min] | 8.0 | 0.6 | 8.0 | 79 | 81 |
| Tm | [° C.] | 162.5 | 165.0 | 165.0 | 162.6 | 165.0 |
| Tc | [° C.] | 113.3 | 114.3 | 124.8 | 122.4 | 120.5 |
| Tg | [° C.] | 1.5 | 0.9 | 1.5 | 2.0 | 2.0 |
| XCS | [wt.-%] | 2.2 | 2.3 | 2.6 | 4.9 | 2.8 |
| Tensile Modulus | [MPa] | 1670 | 1663 | 1672 | 1701 | 1687 |
| Charpy NIS +23° C. | [kJ/m$^2$] | 2.53 | 7.8 | 3.5 | 1.72 | 1.57 |
| VOC (pellets) | [ppm] | 55 | 17 | 45 | 135 | 206 |
| FOG (pellets) | [ppm] | 200 | 38 | 114 | 418 | 483 |
| VOC (plaques) | [ppm] | 57 | — | 49 | 112 | 150 |
| FOG (plaques) | [ppm] | 211 | — | 102 | 410 | 413 |

The invention claimed is:

1. Process for producing a propylene homopolymer in a sequential polymerization process comprising at least two reactors (R1) and (R2), the propylene homopolymer having:
    (a) a melt flow rate $MFR_2$ (230° C./2.16 kg) measured according to ISO 1133 in the range of 0.1 to 90 g/10 min; and
    (b) a pentad isotacticity (mmmm) of more than 90.0% determined by $^{13}$C-NMR, wherein further;
    (c) the propylene homopolymer fulfills in equation (I):

$$VOC \leq (MFR \times 2.27) + 32.0$$

wherein,
    VOC is the amount of volatile organic compounds (VOC) [in ppm] measured according to VDA 278:2002 of the propylene homopolymer;
    MFR is the melt flow rate $MFR_2$ (230° C./2.16 kg) measured according to ISO 1133 of the propylene homopolymer; the process comprising:
    producing in the first reactor (R1) and subsequently transferring into the second reactor (R2) a first propylene homopolymer fraction (H-PP1); and producing in the second reactor (R2) a second propylene homopolymer fraction (H-PP2) in the presence of the first propylene homopolymer fraction (H-PP1), and
    wherein the propylene homopolymer has been polymerized in the presence of:
    (a) a Ziegler-Natter catalyst (ZN-C) comprising compounds (TC) of a transition metal of group 4 to 6 of IUPAC, a Group 2 metal compound (MC), and an internal donor (ID), wherein said internal donor (ID) is a non-phthalic compound;
    (b) optionally a co-catalyst (Co); and
    (c) optionally an external donor (ED).

2. Process according to claim 1, wherein the propylene homopolymer has an amount of volatile organic compounds (VOC) measured according to VDA 278:2002 of equal or below 215 ppm.

3. Process according to claim 1, wherein the propylene homopolymer has a melting temperature Tm of equal or more than 160° C.

4. Process according to claim 1, wherein the propylene homopolymer has a crystallization temperature of equal or more than 114° C.

5. Process according to claim 1, wherein the propylene homopolymer has a xylene cold soluble content (XCS) determined according ISO 16152 (25° C.) of at least 1.8 wt. %.

6. Process according to claim 1, wherein the propylene homopolymer has 2,1 erythro regio-defects of equal or below 0.4 mol. % determined by $^{13}$C-NMR spectroscopy.

7. Process according to claim 1, wherein the propylene homopolymer has a pentad isotacticity (mmmm) of more than 93.0% determined by $^{13}$C-NMR.

8. Process according to claim 1, wherein the propylene homopolymer fulfils in equation (II):

$$FOG \leq (MFR \times 4.80) + 100.0$$

wherein,

FOG is the amount of fogging compounds (FOG) [in ppm] measured according to VDA 278:2002 of the propylene homopolymer; and MFR is the melt flow rate MFR$_2$ (230° C./2.16 kg) measured according to ISO 1133 of the propylene homopolymer.

9. Process according to claim 1, wherein the propylene homopolymer has an amount of fogging compounds (FOG) measured according to VDA 278:2002 of not more than 490 ppm.

10. Process according to claim 1, wherein the propylene homopolymer has a tensile modulus measured at 23° C. according to ISO 527-1 (cross head speed 1 mm/min) of at least 1,500 MPa.

11. Article comprising the propylene homopolymer obtained by the process according to claim 1.

12. Process according to claim 1, wherein:
(a) the internal donor (ID) is selected from optionally substituted malonates, maleates, succinates, glutarates, cyclohexene-1,2-dicarboxylates, benzoates and derivatives and/or mixtures thereof; and
(b) the molar-ratio of co-catalyst (Co) to external donor (ED) [Co/ED] is 5 to 45.

* * * * *